(12) United States Patent
Franceschini et al.

(10) Patent No.: US 8,356,153 B2
(45) Date of Patent: Jan. 15, 2013

(54) ADAPTIVE WEAR LEVELING VIA MONITORING THE PROPERTIES OF MEMORY REFERENCE STREAM

(75) Inventors: Michele M. Franceschini, White Plains, NY (US); John P. Karidis, Ossining, NY (US); Luis A. Lastras-Montano, Cortlandt Manor, NY (US); Moinuddin K. Qureshi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 12/950,522

(22) Filed: Nov. 19, 2010

(65) Prior Publication Data

US 2012/0131304 A1    May 24, 2012

(51) Int. Cl.
  *G06F 13/00* (2006.01)
(52) U.S. Cl. ......... 711/165; 711/103; 711/154; 711/156
(58) Field of Classification Search .................. 711/103, 711/154, 156, 165
  See application file for complete search history.

(56) References Cited

U.S. PATENT DOCUMENTS

| | | | |
|---|---|---|---|
| 6,000,006 A | 12/1999 | Bruce et al. | |
| 7,707,353 B2 | 4/2010 | Suda | |
| 2007/0136523 A1* | 6/2007 | Bonella et al. | 711/113 |
| 2008/0209112 A1 | 8/2008 | Yu et al. | |
| 2009/0168524 A1 | 7/2009 | Golov et al. | |
| 2010/0064111 A1 | 3/2010 | Kunimatsu et al. | |
| 2011/0047319 A1* | 2/2011 | Jeon et al. | 711/103 |

* cited by examiner

*Primary Examiner* — Reba I Elmore
(74) *Attorney, Agent, or Firm* — Cantor Colburn LLP; Brian Verminski

(57) ABSTRACT

Adaptive write leveling in a memory system that includes a memory that has one or more limited lifetime memory devices and an adaptive write leveling module connected to the memory. The adaptive write leveling module is operative for monitoring a write data stream that includes write line addresses. A property of the write data stream is detected and a write leveling process is adapted in response to the detected property. The write leveling process is applied to the write data stream to generate physical addresses from the write line addresses.

16 Claims, 5 Drawing Sheets

ADAPTIVE WEAR LEVELING VIA MONITORING THE PROPERTIES OF MEMORY REFERENCE STREAM

BACKGROUND

This invention relates generally to computer memory, and more specifically, to adaptive write leveling in limited lifetime memory devices.

Phase-change memories (PCMs) and flash memories are examples of non-volatile memories with limited endurance (also referred to as a "limited life"). Such memories have limited endurance in the sense that after undergoing a number of writing cycles (RESET cycles for PCM, program/erase cycles for flash memory), the memory cells wear out and may no longer be able to reliably store information.

A typical unit of access to a memory is a block that may include tens to hundreds of device cells each of which may be storing one bit of data (single-level cell) or a few bits of data (multi-level cell). Each cell within a block may have a different lifetime than other cells in the same block due to the statistical nature of device manufacturing processes. Thus, cells within a block may fail at different times, rendering the entire block unusable. To help alleviate this problem, error checking and correcting (ECC) techniques are utilized within each memory block. Additional cells are used in each block to be able to encode data in a variety of manners to recover from cell errors, therefore prolonging the block life.

Some memory addresses (referred to as hot-spots) will be busier than others. In general, hot-spot blocks will fail sooner than less busy blocks. Hot spots, if not avoided, can render the entire memory (e.g., one or more memory devices) unusable due to a single bad block. Wear-leveling methods prolong the life of these memories by uniformly distributing writes/erasures across the whole memory such that every block receives an approximately equal number of writes over the lifetime of the whole memory.

BRIEF SUMMARY

An embodiment is a method for performing adaptive write leveling in a memory system. The method includes monitoring a write data stream that includes write line addresses. A property of the write data stream is detected and a write leveling process is adapted in response to the detected property. The write leveling process is applied to the write data stream to generate physical addresses from the write line addresses.

An embodiment is a memory system that includes a memory including one or more limited lifetime memory devices and an adaptive write leveling module connected to the memory. The adaptive write leveling module is operative for monitoring a write data stream that includes write line addresses. A property of the write data stream is detected and a write leveling process is adapted in response to the detected property. The write leveling process is applied to the write data stream to generate physical addresses from the write line addresses.

Another embodiment is a computer program product for performing adaptive write leveling in a memory system. The computer program product includes a tangible storage medium readable by a processing circuit and stores instructions for execution by the processing circuit for performing a method. The method includes monitoring a write data stream that includes write line addresses. A property of the write data stream is detected and a write leveling process is adapted in response to the detected property. The write leveling process is applied to the write data stream to generate physical addresses from the write line addresses.

A further embodiment is a memory system that includes a memory that includes one or more limited lifetime memory devices and an adaptive write leveling module connected to the memory. The adaptive wear leveling module is operative for monitoring a write data stream for the memory. The write data stream includes write line addresses. A property of the write stream is detected and a write leveling process is adapted in response to the detected property. The write leveling process is performed on the write data stream to generate physical addresses in the memory from the write line addresses by applying a function to the write line addresses.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
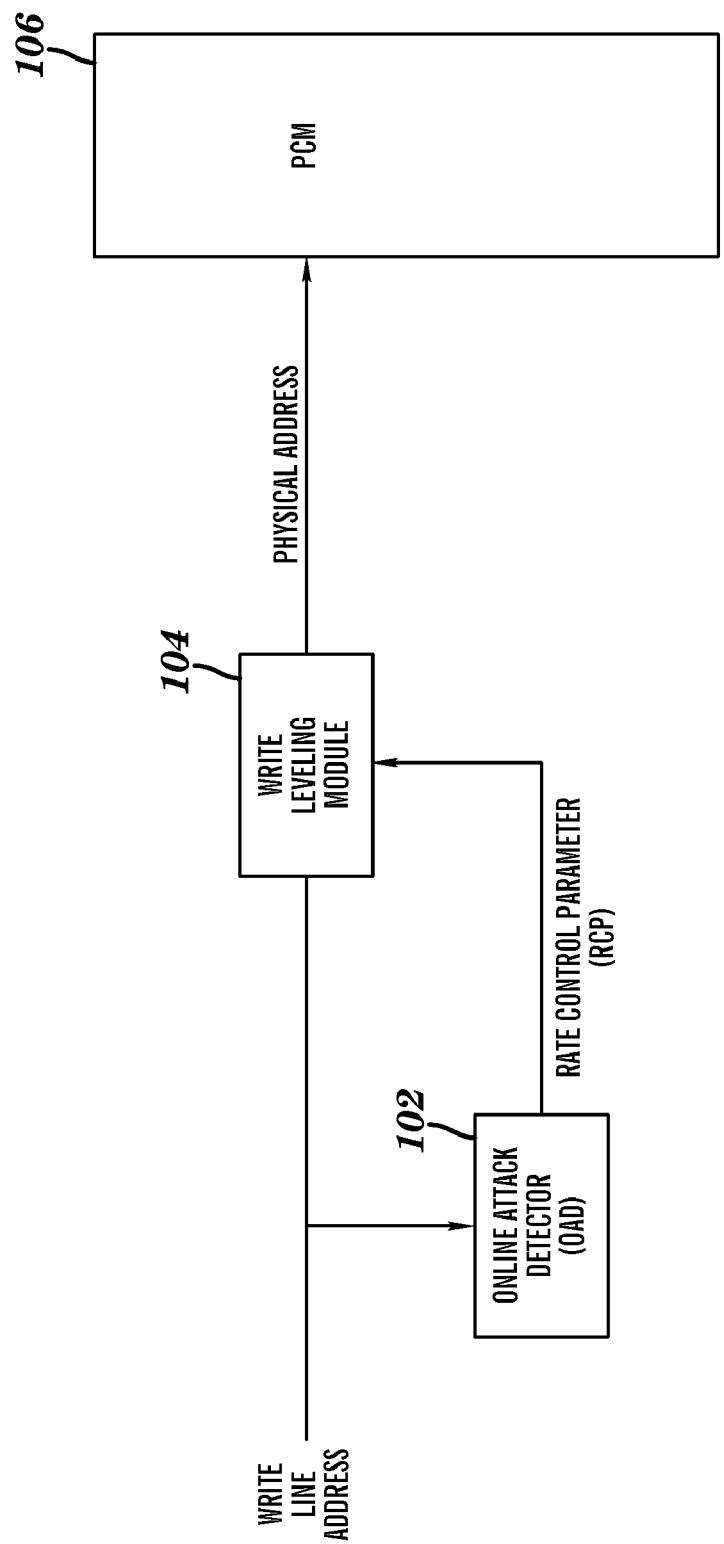
FIG. 1 illustrates a block diagram of a memory system for performing adaptive write leveling in accordance with an exemplary embodiment.

An embodiment of the present invention provides an adaptive write leveling (AWL) framework that provides protection against uneven memory wear caused by malicious write streams while maintaining a negligible (e.g., one percent) write overhead for typical applications. An embodiment includes a novel online attack detector (OAD) that adapts a rate of wear leveling based on properties of the current memory reference (write) stream. Adapting the wear leveling rate based on properties of the memory write stream allows a lower wear leveling rate with a lower overhead cost to be used for typical applications, and a higher wear leveling rate with a higher overhead cost to be used for applications with malicious access patterns.

In an embodiment, the OAD estimates an attack density that is also used for other preventive actions such as the identification of malicious applications so that an operating system (OS) and/or system administrator can be informed (e.g., by generating an alert) to take actions for dealing with such applications. In another embodiment, the attack density is used to monitor the quality of write streams throughout the lifetime of a machine to identify potential warranty frauds.

As direct random access memory (DRAM) scaling slows down, architects are focusing on exploiting emerging memory technologies, such as phase change memories (PCMs), to build future main memory systems. While PCM has several desirable attributes such as high density and good scalability, it does suffer from the drawback of limited write endurance. Each contemporary PCM cell is projected to endure a maximum of about $10^7$ to $10^8$ writes. While this range of write endurance may be sufficient for a typical memory system, the actual lifetime is reduced significantly due to write traffic that is non-uniform across a memory space. The heavily written lines fail much faster than the rest of the lines and can cause system failure much earlier than the expected lifetime. As used herein, the term "memory space" refers to the range of addresses in memory. As used herein, the term "written line" refers to a memory line that is written by the processor The lifetime of a PCM system can be increased significantly by making the writes uniform throughout the entire memory space. Write leveling techniques attempt to make writes uniform by remapping frequently written lines to other physical memory locations. Contemporary write leveling algorithms were developed for typical workloads and are vulnerable to attacks that try to write to the same line repeatedly. Devising such attacks is quite simple (e.g., using a few lines of code), they can be run in a user space without any special operating system (OS) support (e.g., when written in the C programming language), and they can result in a system lifetime being reduced to a few hours or days.

One manner of implementing secure wear leveling is to perform a randomized remapping of lines of the address space. Remapping of memory incurs extra writes, referred to herein as the "write overhead" of wear leveling. In general, a wear leveling algorithm contains a rate control parameter (RCP), that controls the rate at which remapping of memory is performed. The RCP rate determines the effectiveness of the wear leveling algorithm as well as the write overhead. A high rate is more effective at making the writes more uniform across the memory space, however a high rate also results in a higher write overhead. In general, the higher the non-uniformity in write traffic, the faster the rate must be.

The non-uniformity in write traffic experienced by the lines can be captured by a simple metric such as the peak to mean ratio (PMR). PMR is the ratio of number of writes to the most frequently written lines to the average number of writes across all lines. An ideal value of PMR is 1, which denotes a write pattern that writes uniformly to all lines in a memory space. For an attacking pattern that continuously writes to a single line, PMR has the highest possible value, which is N, the number of lines in memory. Given that a typical memory system contains (tens of) millions of lines, the difference between a best PMR and a worst PMR can be six or more orders of magnitude.

A PMR equal to one indicates that the memory system does not require any wear leveling. However, typical applications do not have an ideal PMR, but instead have a PMR that is within 1-2 orders of magnitude of the ideal value. In embodiments described herein, attacks inevitably have to write to very few lines repeatedly, which means that their PMR is within about 0-2 orders of magnitude from N. Thus, PMR can be used to separate typical applications and attack-like applications. When PMR is close to the ideal value, wear leveling at a very low rate is sufficient. However, when PMR is at a higher value (possibly indicating an attack), a much higher rate of wear leveling is required.

Contemporary secure wear leveling algorithms tune the RCP to a constant rate assuming that the memory is always experiencing the worst possible access pattern, which, in general is an overly pessimistic assumption and results in very high write overhead. Contemporary wear leveling algorithms perform memory remapping at a constant rate, without being aware of the properties of the memory access stream. If this rate is always high then the write overhead is significant, and if this rate is low then the system becomes vulnerable to attacks. An embodiment described herein provides a write leveling algorithm that has negligible write overhead for typical applications and while still reducing the impact of malicious write access patterns on the lifetime of the memory. Thus, an embodiment described herein utilizes a programmable RCP (i.e., to generate a programmable rate) that increases when the number (estimated or actual) of write line addresses specifying the same write line address increases, and decreases when the number (estimated or actual) of write line addresses specifying the same write line decreases.

As used herein, "adaptive write leveling" or "AWL" refers to write leveling that is a function of the properties of the memory reference stream: high for attacking applications and low for typical applications. A property of the memory reference stream is based on observed and/or estimated data and may include, but is not limited to: a number of times a write line addresses specifies the same write line address, an estimated number of write line addresses specifying the same write line address, and an estimated number of writes to a given plurality of line addresses.

To aid the identification of harmful access patterns, an embodiment utilizes the notion of attack density, which is the ratio of the number of writes to the most frequently written line(s) to the total number of writes in a given window of time. For patterns that write to a single line, the attack density is equal to one. However, contemporary memory systems typically have several levels of caching, and the last level cache is several megabytes, which means that the episode of writing to the same line in memory within a short period of time is expected to be extremely rare. For typical applications, the likelihood of a write back matching any of the previous one thousand write backs is very small. Thus, in an embodiment, the attack density for attacking applications is estimated by a tracking a window of the last one thousand writes and measuring the hit rate of this window. This circuit used to track the writes is referred to herein as an online attack detector (OAD).

In some environments, using a tracking window containing the last one thousand writes may be impractical to implement because it requires significant hardware overhead (one thousand entries) and energy (all entries checked on each write access). In an embodiment described herein, a practical attack detector (PAD) that tracks a small number of entries and inserts the incoming write addresses with a small probability is utilized. In an embodiment, a sixteen entry PAD is used along with a replacement algorithm that uses frequency information to increase the robustness of PAD. This embodiment estimates attack density, is applicable to a wide variety of write leveling algorithms, and requires a storage overhead of only sixty-eight bytes.

Referring to FIG. 1, a block diagram of a memory system for performing AWL in accordance with an embodiment is generally shown. The system depicted in FIG. 1 includes a memory 106 (in the embodiment shown in FIG. 1, a PCM), an online attack detector (OAD) 102, and a write leveling module 104. In an embodiment, an AWL module includes the OAD 102 and the write leveling module 104. As shown in FIG. 1, the write leveling module 104 receives a write line address and generates a physical address for accessing the memory 106. In addition, the write line address is input to the OAD 102, which generates a rate control parameter (RCP)

that is used to control the amount of remapping performed by the write leveling module 104. The write leveling module 104 and the OAD 102 may be implemented in hardware and/or software and may be located in any location that is accessible by a processor that generates the line address such as, but not limited to the processor, a memory controller, and a hub device on a memory module. The write leveling module 104 outputs physical addresses that may be utilized to access a block of data in a memory 106 that is spread across one or more memory devices, memory ranks, and/or memory modules.

In an embodiment, the write leveling module 104 is implemented by a start gap model of write leveling, however any write leveling scheme (e.g., a single level security refresh scheme) that utilizes a rate control parameter may be implemented by embodiments of the write leveling module 104.

FIG. 1 illustrates the write line addresses (also referred to as "write addresses") being received by the write leveling module 104 and the OAD 102, and the physical address being transmitted to the memory 106. As is known in the art, other information such as data and commands may also be communicated between these components in order to support memory access operations. Though not shown in FIG. 1, other elements, such as a memory module and/or a memory controller may also be required to support memory operations.

As used herein, the term "line" refers to a unit of memory that is accessed on a cache miss. As used herein, the term "line address" refers to address of the line in the memory address space. As used herein, the term "physical address" refers to the actual location where the data is intended to be stored.

As used herein, the term "attack application" or "attacker" refers to a program that repeatedly tries to write to a small subset of memory location with the aim of causing quick failure of the memory line or lines. A line is attacked when it receives a large number of writes in a relatively short duration.

As described previously, secure write leveling algorithms make every application pay a high overhead. A less costly approach is implemented by embodiments of the OAD 102 and write leveling module 104 described herein, where overhead costs are kept to a minimum for typical applications, with a higher overhead cost being paid by applications having properties that are similar to attack applications. In an embodiment, this is performed by allowing the RCP to vary based on properties of the write stream that are determined by observing the write line addresses in the write stream. An embodiment of the AWL described herein is implemented by having the OAD 102 monitoring the write stream and adjusting the RCP.

As shown in FIG. 1, the OAD 102 analyzes the memory reference stream to detect attack-like streams. Based on this information, the OAD 102 increases the frequency of remapping when attack like streams are detected, thus providing more robustness and security. In an embodiment, this information is also used to transmit an alert to an OS or system administrator when one or more properties of the memory reference stream reach a programmable threshold.

There are a variety of practical considerations that may be weighed when setting up an AWL implementation. In one embodiment, the AWL is based on a start-gap approach to write leveling. In a start-gap scheme, an extra line (a gap line) is included in the memory, and after every x number of writes (RCP=1/x) one line is moved to its neighboring location in a randomized address space. In this scheme, after one complete rotation of the gap line, all lines in memory have moved by exactly one position. For a memory bank with N lines, the line vulnerability factor (LVF)=N·x. As used herein, the term LVF refers to the maximum number of writes to a line that occur before that line gets moved by the write leveling module 104. If the LVF is close to the endurance of the line, e.g., endurance/2, then in each round of attack half of the lifetime of the line is lost. In this example, the attacker just needs to find one of the lines that have been attacked before to cause a line failure.

As used herein, the term "endurance of the line" refers to the number of times the line can be written before failing. If E is the endurance of the line, and given a desired value of LVF is E/128, x=E/128·N. Given that E=64 million (M) and N=4M, this would result in a value of x that is much less than one, indicating several gap movements for each demand write to memory. However, x would have to be greater than or equal to 100 in order to limit the write overhead to less than one percent. To balance, these contradictory requirements, an embodiment changes x from a static value to a dynamic value which depends on the behavior of the memory write stream.

In general, between consecutive writes to a given line there are several writes to other locations of memory. Since embodiments are concerned only about the most frequently written line, the metric of interest is the number of writes between consecutive writes to the most frequently written line. Attack density (AD) is defined as the ratio of the number of writes to the most frequently written line to the total number of writes within a given time period. In an embodiment, the given time period is programmable, may be referred to herein as a programmable time window. If there are writes to other lines in memory, in between consecutive writes to a given line, this reduces the Effective LVF (ELVF) perceived by the line in proportion to AD: ELVF=LVF·AD.

To limit the lifetime lost under one round of attack to E/128, the desired value of dynamic x, which is denoted herein by $x^1$ s, is derived in an embodiment as follows:

$$ELVF=E/128 \Rightarrow N \cdot x^1 \cdot AD = E/128 \Rightarrow E/(128 \cdot N \cdot AD)$$

Thus, $x^1$ is inversely proportional to AD, which means that the rate of wear leveling is directly proportional to AD. Typically, secure wear leveling algorithms implicitly assume AD=1. However, in practice AD may be lower by several orders of magnitude for typical applications.

An embodiment utilizes a hardware circuit that keeps track of the most recent one thousand write addresses to measure the value of AD. On each write access, all the recent one thousand addresses are checked, and the number of accesses that hit in this window is counted. In an embodiment, the value of AD is estimated as the hit rate of the window, pessimistically assuming that all hits are coming from the same line. If the hit count in the window is greater than a certain threshold, then the application is likely to be an attack application. A drawback to embodiment is that the circuit incurs a relatively large area, power, and latency overhead.

For an attack to successfully cause failure in lifetime limited memories in a short time, it has to write to a few lines, repeatedly, and at a sufficiently high write bandwidth. All the three requirements are important. For example, if the attack simultaneously focuses on several thousand lines, then AD will be in a range where even the default start gap will move the lines before significant wear-out. The writes must be done repeatedly (e.g., several million times) for each line, otherwise the wear-out on each line will be negligible. And, if the attack happens at very low write bandwidth, then the time for the attack to succeed will increase linearly.

Figure 2:
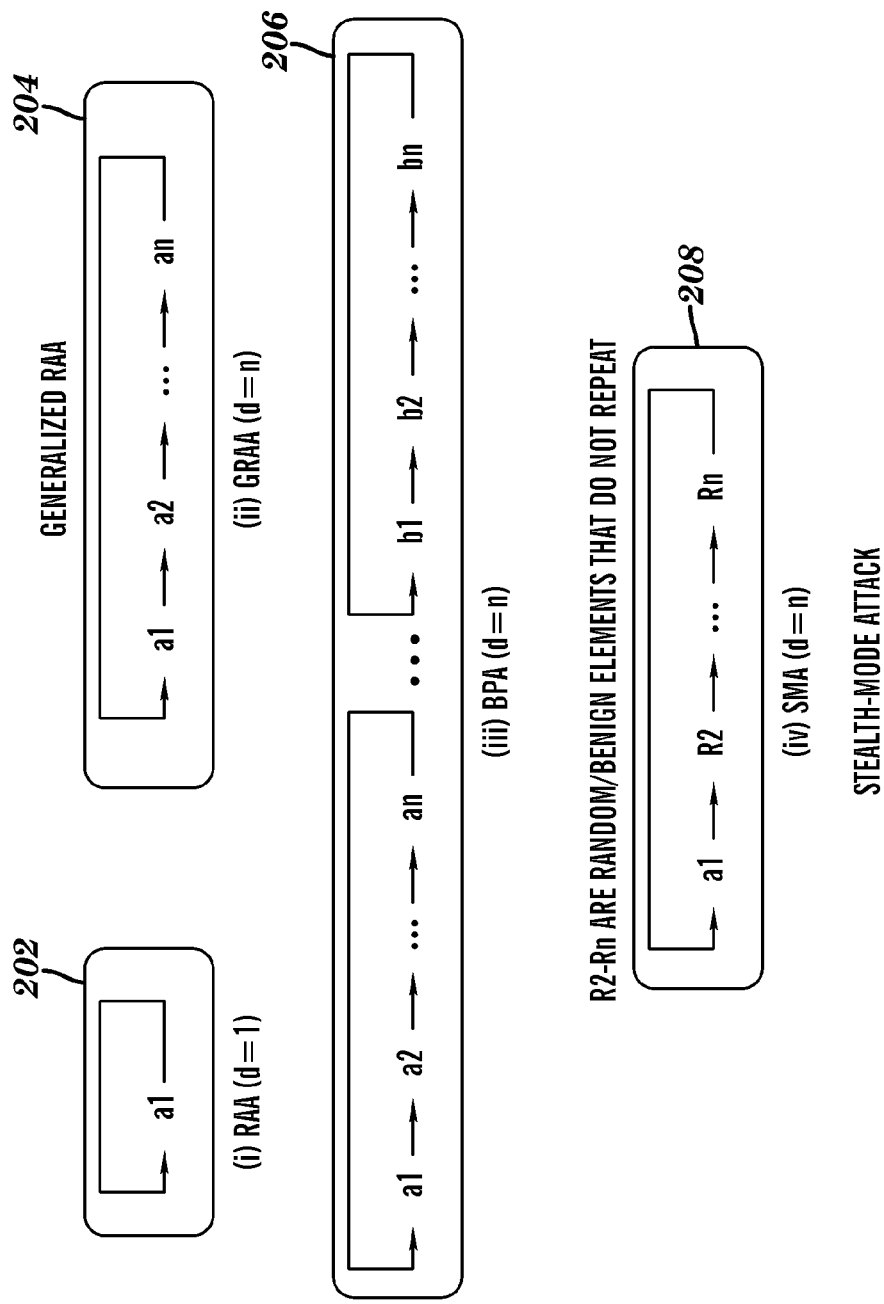
FIG. 2 illustrates example canonical forms of attacks on memories.

Referring to FIG. 2, several canonical forms of attacks are generally shown. All of these attacks are minor modifications of the repeat address attack, are extremely simple to implement (about 10 lines of C code), and easily circumvent the levels of caching found in modern processors. The repeat address attack (RAA) 202 continuously writes to the same line. Therefore, AD=1. The RAA 202 can be generalized, where the writes are done to n lines continuously, this is shown as the generalized RAA (GRAA) 204 with period n. For the GRAA 204, AD=1/n. The birthday paradox attack (BPA) 206 can be viewed as a form of GRAA 204, which changes the working set after every several million writes. For the BPA 206, AD=1/n. The fourth attack shown in FIG. 2, is the stealth mode attack (SMA) 208 which attacks only one line but disguises it in other (n−1) lines. These lines are chosen randomly and may not repeat across iterations. For the SMA 208, AD=1/n, but the attack is concentrated on only one line.

Figure 3:
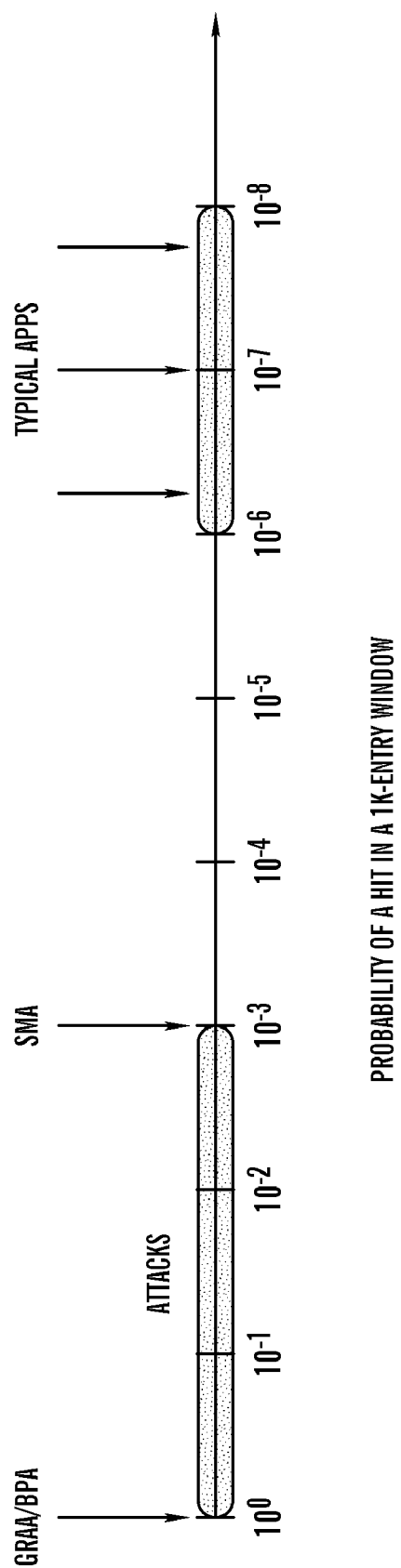
FIG. 3 illustrates an example of probabilities of accessing a same address line for attack applications and typical applications.

Referring to FIG. 3, the probability of hit in a window of the most recent one thousand writes for the attacks shown in FIG. 2 and typical applications in accordance with an embodiment are generally shown. As shown in the example in FIG. 3, there is three to four orders of magnitude difference between the hit rate from attack-like patterns and patterns from typical workloads. The SMA 208 is the most challenging to detect among the attacks. If the SMA 208 can be detected, then the GRAA 204 (and hence the BPA 206) can be detected as well, as they have multiple attack lines thus providing a higher chance of being detected. Therefore, the discussion herein focuses on detecting SMA 208 type attacks.

An embodiment is concerned with measuring hits in a window of one thousand writes, given that in the common case almost none of the lines provide a hit. A hit rate can be approximated in such a scenario by having a stack with few entries and simply inserting the address of the incoming write request in the stack randomly and with a very small probability. This circuit is referred to herein as a practical attack detector (PAD). In addition to the stack entries, an embodiment of the PAD also contains two global counters, Hit-Counter and WriteCounter, to estimate the hit ratio. Each incoming write address is checked in the PAD and increments the WriteCounter. If there is a hit, the HitCounter is incremented and the replacement information of that line is updated. If there is a miss, then with probability p, the given address is inserted in the stack.

If the WriteCounter or the HitCounter reaches its maximum value, the hit rate of the stack is calculated, and both counters are halved. The AD is estimated as simply the hit rate, conservatively assuming all the hits are coming from a single line. For example, for a 208 SMA that repeats once every one thousand writes, the hit rate is $10^{-3}$ and the estimated AD is $10^{-3}$. In an embodiment, the estimated value of AD is stored in a register, DensityReg, and this value is used for determining the rate of write leveling between periods of density calculation. An embodiment uses a 10-bit HitCounter and a 20-bit WriteCounter. Note, that any density calculation that leads to an estimated AD that is less than $10^{-3}$ is overridden with a default value of AD=$10^{-3}$. A key component of the PAD is the replacement policy. An embodiment uses a least recently used (LRU) replacement policy, and is referred to herein as a LRU-Based PAD or simply L-PAD.

By varying the insertion probability (p), the PAD circuit can be programmed to monitor different window sizes. In an embodiment, the PAD must detect attacks that interleave fewer than the window size number of writes between consecutive writes to a given line. The effective window size of L-PAD is a function of p. In an embodiment, with a p=1/64 an effective window of 256 writes can be tracked, with a p=1/256 one thousand writes, and with p=1/1,000 four thousand writes.

In the discussion below, p=1/256 is utilized to provide a window of 256 writes for tracking.

In an embodiment, the detection latency of the PAD is relatively low. The PAD inserts the line with a probability p=1/256, which means that the line has to be written several times before it gets inserted in the detector. In an embodiment, the probability that the line will not get inserted after n trials is about $e^{-np}$ (e.g., $e^{-16}$ after four thousand writes). Thus, the line is almost guaranteed to be detected in a few thousand occurrences. For an endurance of 64M, 32K writes represent a tiny 0.05% of lifetime lost before detection. As decisions about estimating AD are made at one thousand hits, the actual detection latency would be at most one thousand writes after insertion.

A related calculation of merit for detection is how many hits are counted by the detector after n attacking writes. All attacking writes before the line gets inserted in the detector go unnoticed, and after insertion all the writes get counted as hits, while the line is present in the detector. In an embodiment, for low values of n (i.e., n<32) the expected number of hits are significantly lower than actual writes. However, as the number of attacking writes is increased to one thousand or more, the two numbers become similar. Thus, for patterns where lines are attacked for more than one thousand lines, the detector is quite accurate.

Another key metric for PAD is retention period, which is defined as the number of non-matching writes required to evict an entry from the detector, after the line has ceased to give a hit. Because embodiment described herein use an L-PAD with 16-entries, 16 insertions must happen to evict an entry. Thus, on average the detector needs about four thousand (16·1/p) writes to evict a line. As insertion is a random event, retention period is not a constant but a Gaussian random variable with a mean of 4 thousand (K) and a standard deviation of 1K. In an embodiment, at 4K writes the eviction probability is 50%, at 5K is 84%, at 6K is 97%, and at 7K writes it is 99.9%. Thus, after 7K non-matching writes the line is almost guaranteed to get evicted.

It may be possible for an adversary (e.g., and attack application) to get around the L-PAD by simply writing to a line few times (much lower than the average detection latency) followed by enough random writes to get the line evicted from L-PAD. Attacks of this form are termed Generalized SMA (GSMA) attacks and they can cause the detector to forget the entry quickly after it gets detected. Therefore, the number of detected hits becomes much lower than the attacking writes. One approach to avoiding this issue is to retain lines that give a frequent hit while in the detector longer than other lines, as the lines with frequent hits are likely to be the lines being attacked. In this embodiment, the detector is referred to as a frequency based PAD (F-PAD) and it uses frequency based replacement instead of LRU replacement.

The replacement algorithm used in an embodiment of the F-PAD provides an aging mechanism, so that lines that have ceased to provide any hit for a relatively long time will eventually get evicted (otherwise the detector will become ineffective as soon as the frequency counters of all entries are saturated). In an embodiment, a reuse replacement algorithm is used as a means of incorporating frequency information while still providing aging. The structure of F-PAD is basically the same as the structure of L-PAD, except for the replacement algorithm. In the F-PAD structure, each of the 16-entries has a multi-bit frequency counter instead of LRU bits. If an accessed line is found in the detector, then the counter associated with that entry is incremented using saturating arithmetic. In an embodiment, a victim pointer (vptr) is added to aid searching for the victim entry. To find a victim, the frequency counter associated with the entry pointed to by the vptr is checked. If it is zero, then that entry is selected for eviction. Otherwise, the frequency counter of that entry is decremented and the next entry is checked. This process is repeated until a victim is found. When a new line is installed, the frequency counter associated with that entry is initialized to zero, and the vptr is incremented to point to next entry. This ensures that all the other entries will be checked for eviction before the newly installed entry, giving the newly installed entry a chance to accrue a hit.

Once an attacking line is in F-PAD, each subsequent write contributes not only to the detected hits but also increases the frequency counter associated with the entry, making it harder to evict that entry. Therefore, the higher the frequency count, the longer is the retention period. In an embodiment, the F-PAD stores sixteen entries, with each entry having an eight bit frequency counter.

An embodiment, of the F-PAD (located e.g., in the OAD 102) incurs very low hardware overhead. It requires sixteen entries each of which is approximately four bytes. The two global counters account for a total of less than four bytes. Thus, the total storage overhead for an embodiment of the F-PAD is approximately 68 bytes.

Figure 4:
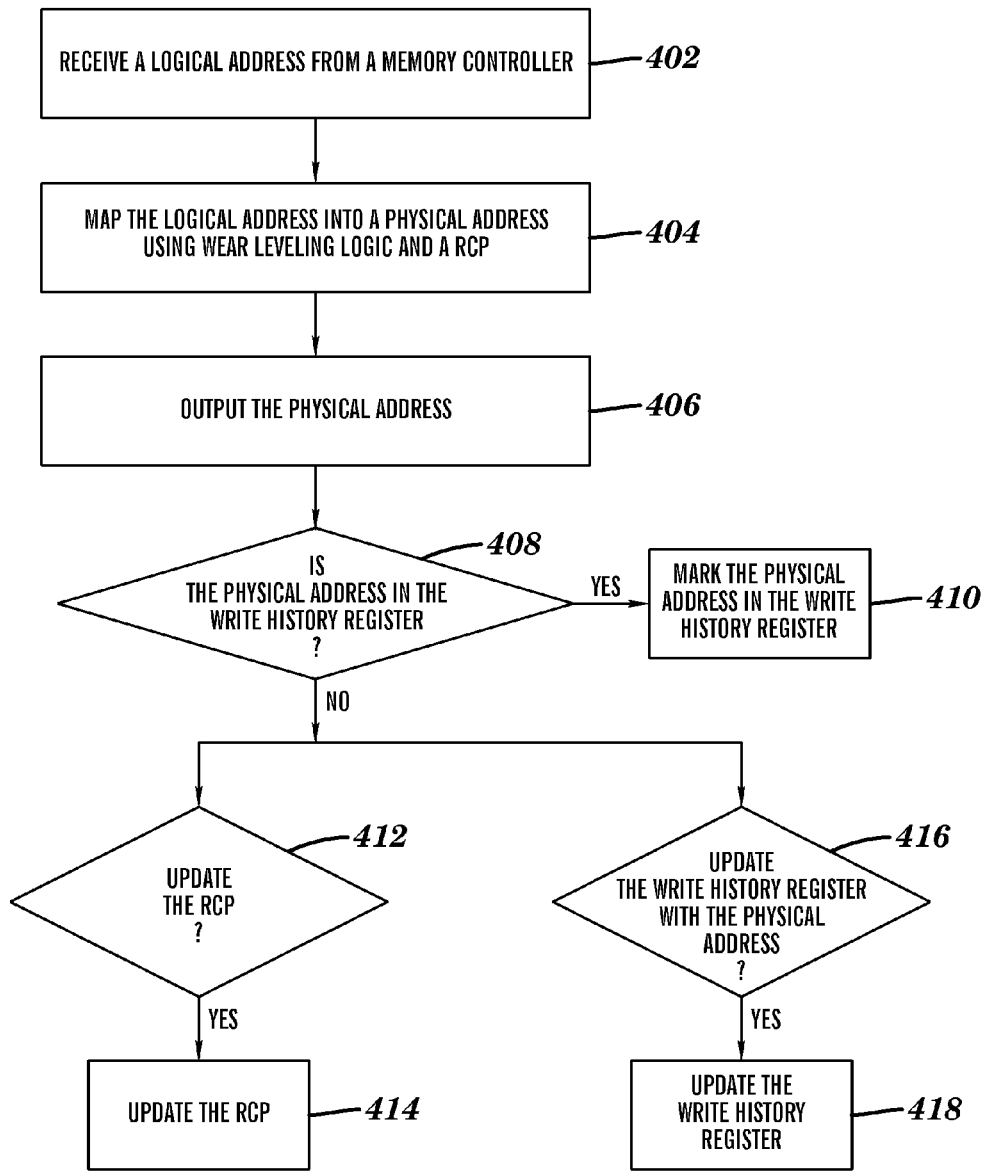
FIG. 4 illustrates a process flow for performing adaptive write leveling in accordance with an exemplary embodiment.

Referring to FIG. 4, a process for performing AWL is generally shown. In an embodiment, the process in FIG. 4 is performed by the write leveling module 104 and OAD 102 depicted in FIG. 1. At block 402, a write line address is received and at block 404, the write leveling module 104 maps the line address into a physical address. The write leveling module 104 logic performs the mapping using a RCP provided by the OAD 102 that is adjusted by the OAD 102 based on properties of the write data stream. At block 406, the physical address is output.

Processing continues at block 408, where it is determined (e.g., by the OAD 102) whether the write line address is located in the write history register (e.g., a F-PAD). If the write line address is located in the write history register, then block 410 is performed and the write line address is marked in the write history register (e.g., a counter is incremented). Processing continues at blocks 412 and 416, which may be performed in parallel or in serial. At block 412, the OAD 102 determines if the RCP should be updated based on properties of the write data stream. In an embodiment, the RCP is adjusted when the OAD 102 observes that the hit rate is above a certain threshold If it is determined that the RCP should be updated, then processing continues at block 414, where the RCP is update by the OAD 102 to reflect the current write data stream.

At block 416, the OAD 102 determines whether the write history register should be updated with the write line address. In an embodiment, this determination is based on a random process, where write line addresses are selected randomly for inclusion in the write history register. If it is determined that the write line should be added to the write history register, then processing continues at block 418, where the write line address is added to the write history table. In an embodiment, a line address in the write history table with a low number of accesses is replaced by the new line address. In another embedment, an LRU scheme is utilized to select the line address to be removed and replaced with the new line address.

Figure 5:
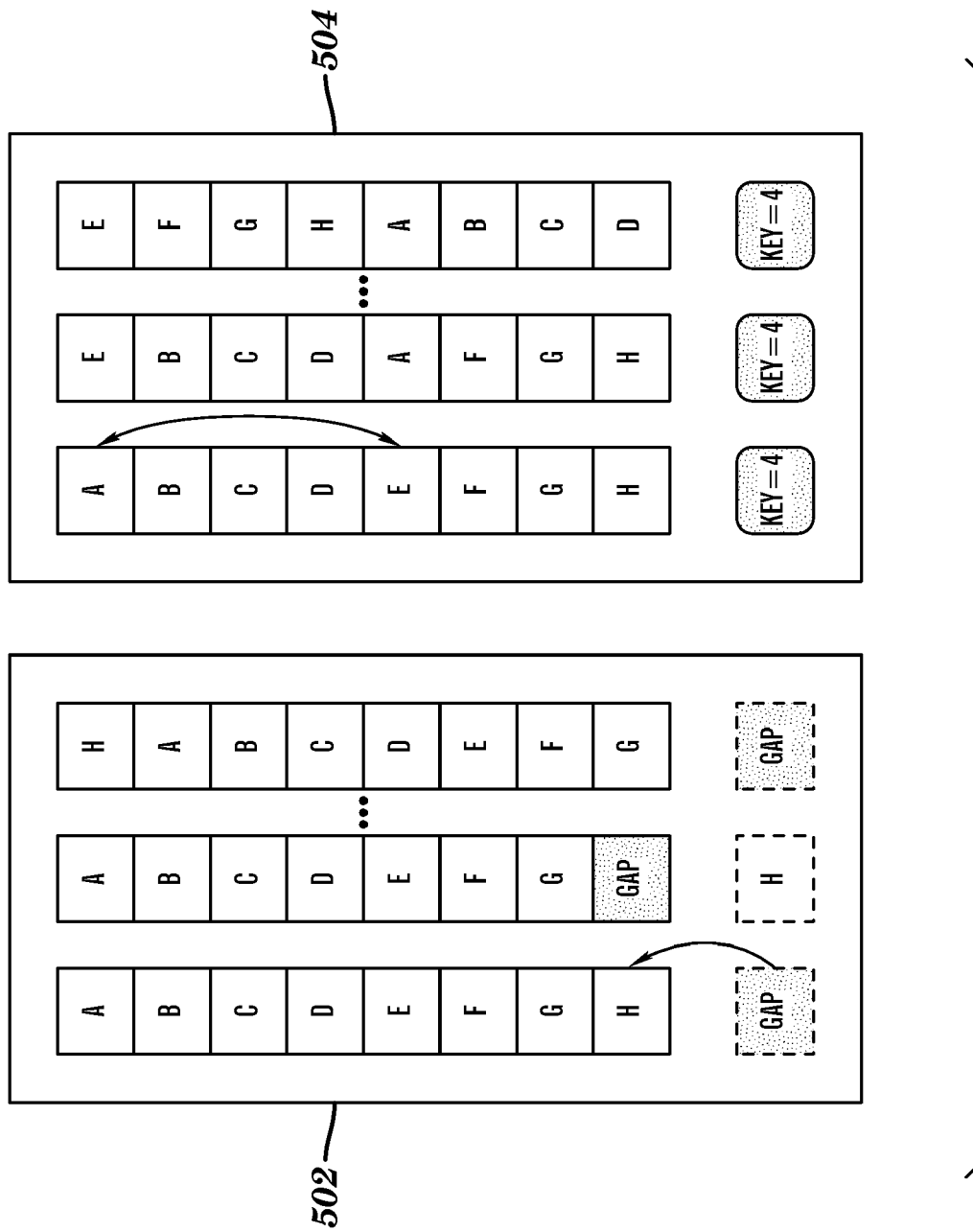
FIG. 5 illustrates start gap and security refresh write leveling schemes in accordance with an exemplary embodiment.

Referring to FIG. 5, embodiments of start gap and security refresh write leveling schemes are generally shown. The start gap and security refresh write leveling schemes are examples of write leveling algorithms where a physical address is calculated by applying a function to the write line address. These schemes that use functions to calculate physical addresses are also referred to herein as "non-table based write leveling algorithms". Non-table based write leveling algorithms are contrasted with table based write leveling algorithms where look-up tables containing physical addresses are used to map logical addresses (e.g., write line addresses) to physical addresses. An example of a table based write leveling algorithm is a flash translation layer (FTL) wear leveling algorithm.

The start gap write leveling algorithm 502 as shown in the embodiment in FIG. 5 contains an extra line (the gap line). After every x writes (RCP=1/x), one line is moved to its neighboring location in a randomized address space. After one complete rotation of the gap line, all lines in memory move by exactly one position.

The embodiment of the security refresh algorithm 504, shown in FIG. 5, is shown as a single level for simplicity, multi-level schemes may also be implemented. In the security refresh algorithm 504, a random key decides the amount that the entire memory region is rotated. Rotation is performed by swapping two lines and each swap is performed after every x writes (RCP=1/x). After all lines are rotated, the entire memory shifts by an amount defined by the random key, and then the key value is changed.

Technical effects and benefits include the ability to distinguish between typical applications and attack-like applications at runtime (e.g., using the OAD). As described herein, the AD metric that correlates with the severity of attacks can be used to determine the rate of write leveling depending on the application. As described herein, the PAD is a practical implementation of the OAD that, in one embodiment, tracks only 16 entries to estimate the AD. In an embodiment, the PAD provides an effective estimate of the severity of attacks while consuming a storage overhead of only 68 bytes. Further, as described herein, an embodiment of the AWL implements a rate of write leveling that is dependent on the estimated AD. The AWL described herein is applicable to a wide variety of write leveling algorithms and may provide a reduced overhead to these schemes while retaining robustness under attacks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A memory system comprising:
a memory including one or more limited lifetime memory devices; and
an adaptive write leveling module connected to the memory, the adaptive write leveling module operative for:
monitoring a write data stream for the memory, the write data stream comprising write line addresses;
detecting a property of the write data stream;
adapting a write leveling process in response to the detected property; and
applying the write leveling process to the write data stream to generate physical addresses in the memory from the write line addresses.

2. The system of claim 1, wherein the property is a number of write line addresses specifying the same write line address within a programmable time window.

3. The system of claim 2, wherein the write leveling process performs remapping between the write line addresses and the physical addresses at a programmable rate, and the programmable rate increases when the number of write line addresses specifying the same write line address increases and the programmable rate decreases when the number of write line addresses specifying the same write line address decreases.

4. The system of claim 1, wherein the monitoring is performed for a random subset of the write data stream.

5. The system of claim 1, wherein the adapting is performed during normal system operation.

6. The system of claim 1, wherein the write leveling process performs remapping at a programmable rate and the adapting comprises setting the programmable rate.

7. The system of claim 1, wherein the adaptive wear leveling module is further operative for transmitting an alert in response to the detected property reaching a programmable threshold.

8. A computer program product for performing adaptive write leveling in a memory system, comprising a tangible storage medium readable by a processing circuit and storing instructions for execution by the processing circuit for performing a method comprising:
   monitoring a write data stream comprising write line addresses;
   detecting a property of the write data stream;
   adapting a write leveling process in response to the detected property; and
   applying the write leveling process to the write data stream to generate physical addresses from the write line addresses.

9. The computer program product of claim 8, wherein the property is an estimated number of write line addresses specifying the same write line address.

10. The computer program product of claim 9, wherein the write leveling process performs remapping between the write line addresses and the physical addresses at a programmable rate, and the programmable rate increases when the number of write line addresses specifying the same write line address increases and the programmable rate decreases when the number of write line addresses specifying the same write line address decreases.

11. The computer program product of claim 8, wherein the property is a number of write line addresses specifying the same write line address within a programmable time window.

12. The computer program product of claim 8, wherein the monitoring is performed for a subset of the write data stream.

13. The computer program product of claim 8, wherein the subset is randomly selected.

14. The computer program product of claim 8, wherein the adapting is performed during normal system operation.

15. A memory system comprising:
   a memory including one or more limited lifetime memory devices; and
   an adaptive write leveling module connected to the memory, the adaptive write leveling module operative for:
      monitoring a write data stream for the memory, the write data stream comprising write line addresses;
      detecting a property of the write data stream;
      adapting a write leveling process in response to the detected property; and
      performing the write leveling process on the write data stream to generate physical addresses in the memory from the write line addresses by applying a function to the write line addresses.

16. The system of claim 15, wherein the property is an actual or estimated number of write line addresses specifying the same write line address within a programmable time window.

* * * * *